(12) United States Patent
Perl

(10) Patent No.: US 10,999,675 B2
(45) Date of Patent: May 4, 2021

(54) MICROPHONE SYSTEM FOR A MOTOR VEHICLE HAVING A DIRECTIVITY PATTERN AND SIGNAL IMPROVEMENT

(71) Applicant: Audi AG, Ingolstadt (DE)

(72) Inventor: Martin Perl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/642,215

(22) PCT Filed: Jun. 7, 2018

(86) PCT No.: PCT/EP2018/064945
§ 371 (c)(1),
(2) Date: Feb. 26, 2020

(87) PCT Pub. No.: WO2019/042606
PCT Pub. Date: Mar. 7, 2019

(65) Prior Publication Data
US 2020/0359132 A1 Nov. 12, 2020

(30) Foreign Application Priority Data
Aug. 31, 2017 (DE) ...................... 10 2017 215 219.2

(51) Int. Cl.
*H04R 3/04* (2006.01)
*H04R 5/04* (2006.01)
(Continued)

(52) U.S. Cl.
CPC ............ *H04R 3/04* (2013.01); *B60R 11/0247* (2013.01); *H04R 3/005* (2013.01); *H04R 5/04* (2013.01); *H04R 2499/13* (2013.01)

(58) Field of Classification Search
CPC . H04R 3/005; H04R 3/04; H04R 5/04; H04R 2499/13; B60R 11/0247
See application file for complete search history.

(56) References Cited

U.S. PATENT DOCUMENTS

| 6,748,086 B1 | 6/2004 | Venkatesh et al. |
| 7,231,051 B2 | 6/2007 | Paviot et al. |
| (Continued) | | |

FOREIGN PATENT DOCUMENTS

| CN | 102685617 A | 9/2012 |
| CN | 105979442 A | 9/2016 |
| (Continued) | | |

OTHER PUBLICATIONS

Perl, Translation of DE102014013919A1, Mar. 24, 2016.*
(Continued)

*Primary Examiner* — Regina N Holder
(74) *Attorney, Agent, or Firm* — Sterne, Kessler, Goldstein & Fox P.L.L.C.

(57) ABSTRACT

This disclosure relates to a microphone system for a motor vehicle, having a first, second and third microphone and a signal processing device, which is configured to process respective signals provided by the microphones; wherein the signal processing device is configured to process the signals of the first and second microphones in such a manner that a driver directivity oriented towards a position of a driver seat is provided, or to process the signals of the second and third microphones in such a manner that a passenger directivity oriented towards a position of a passenger's seat is provided, and to provide a driver interfering noise directivity by processing the signals of two microphones together, and to further process a driver useful signal associated with the driver directivity in dependence on a driver interfering signal associated with the driver interfering noise directivity or to provide a passenger interfering noise directivity by processing the signals of two microphones together, and to further process a passenger useful signal associated with the passenger directivity in dependence on a passenger interfering signal associated with the passenger interfering noise (Continued)

directivity in order to improve a quality of the respective useful signal.

11 Claims, 2 Drawing Sheets

(51) Int. Cl.
*H04R 3/00* (2006.01)
*B60R 11/02* (2006.01)

(56) References Cited

U.S. PATENT DOCUMENTS

| | | | |
|---|---|---|---|
| 10,555,080 B2 | 2/2020 | Truong et al. | |
| 2016/0173676 A1 | 6/2016 | Heo | |
| 2019/0320259 A1 | 10/2019 | Perl | |

FOREIGN PATENT DOCUMENTS

| | | |
|---|---|---|
| CN | 106462027 A | 2/2017 |
| CN | 106664483 A | 5/2017 |
| CN | 107093429 A | 8/2017 |
| DE | 4315000 A1 | 11/1994 |
| DE | 19938171 A1 | 3/2001 |
| DE | 10217822 C1 | 9/2003 |
| DE | 102010034237 A1 | 10/2011 |
| DE | 102013007141 A1 | 12/2013 |
| DE | 102014013919 A1 | 3/2016 |
| DE | 102015220400 A1 | 6/2016 |
| DE | 102016013042 A1 | 5/2018 |
| EP | 1206161 A1 | 5/2002 |
| EP | 3158392 B1 | 3/2020 |
| WO | WO 2009130513 A1 | 10/2009 |

OTHER PUBLICATIONS

International Search Report and Written Opinion of the International Searching Authority directed to related International Patent Application No. PCT/EP2018/064945, with certified English-language translation of Written Opinion, dated Aug. 1, 2018; 25 pages.

Dmochowski, J., et al., "Combined Beamforming and Noise Cancellation", Instrumentation and Measurement Technology Conference, May 17-19, 2005; 5 pages.

Rakesh, P., et al., "Performance Evaluation of Beamforming Techniques for Speech Enhancement", International Conference on Signal Processing, Communications and Networking, Mar. 16-18, 2017; 5 pages.

International Preliminary Report on Patentability directed to related International Patent Application No. PCT/EP2018/064945, completed Dec. 4, 2019, with attached English-language translation; 14 pages.

\* cited by examiner

MICROPHONE SYSTEM FOR A MOTOR VEHICLE HAVING A DIRECTIVITY PATTERN AND SIGNAL IMPROVEMENT

TECHNICAL FIELD

The present disclosure relates to a microphone system for a motor vehicle and a method for operating the microphone system.

BACKGROUND

A variety of microphones are used today in motor vehicles. A microphone array with four microphones, whereby two microphones each are assigned to a driver or a passenger, is known from EP 1 695 873 A1. A noise-compensated hands-free kit in motor vehicles in which two directional microphones are installed in the area of a rear-view mirror is known from DE 43 15 000 A1. DE 102 17 822 C1 lastly discloses a method and an apparatus for detecting the viewing direction of a person by means of at least one directionally selective microphone.

DE 199 38 171 A1 proposes the processing of acoustic signals for a plurality of positions in order to ensure a good communication between the occupants of a vehicle, in which different acoustic signals are controlled in such a manner that an acoustic zone, for example a quiet zone, is established. Disturbing noises can be compensated for in the quiet zone. WO2009/130513 A1 discloses a noise reduction system with two microphones and from DE 10 2013 007 141 A1 a voice input system for a motor vehicle is known which has at least two microphones.

DE 10 2014 013 919 A1 discloses a microphone system with three microphones arranged in the form of an isosceles triangle at respective corners of the triangle, in which the signals of the first and the second microphone are processed in such a manner that a directivity oriented towards the driver seat is provided and the signals of the second and third microphones are processed to provide a directivity oriented towards a passenger seat.

BRIEF DESCRIPTION OF DRAWINGS/FIGURES

DETAILED DESCRIPTION

Figure 1:
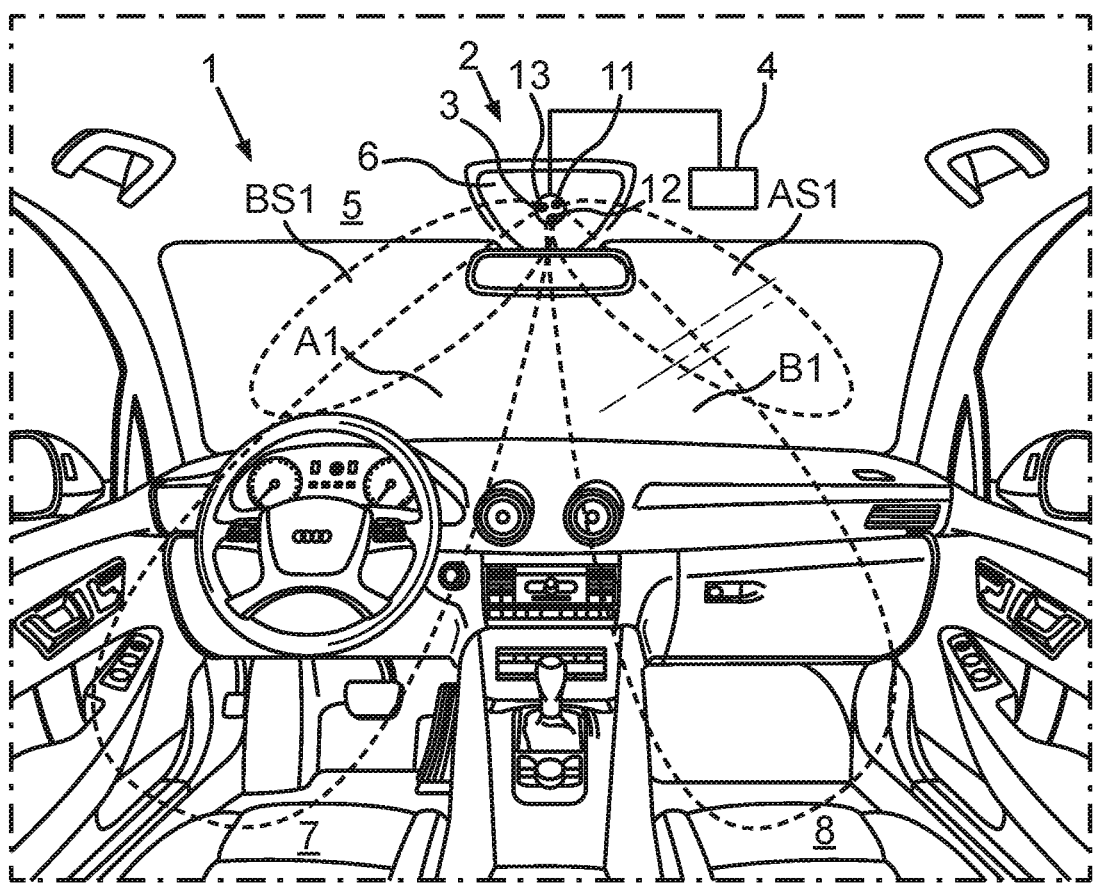
FIG. 1 shows a motor vehicle with a microphone system, in accordance with some embodiments.

The object of the present disclosure is to provide a microphone system for a motor vehicle in which the quality of a useful signal is improved.

This object is achieved by the subject matter of the independent claims. Advantageous embodiments will become apparent in the dependent claims, the description and the figures.

The present disclosure relates to a microphone system for a motor vehicle with a microphone housing, in which a first microphone, a second microphone, and a third microphone are disposed, as well as with a signal processing device, which is configured to process the respective signals provided by the microphones. The signal processing device is configured to process the signals of the first and the second microphone in a first operating mode in such a manner that a (first) driver directivity oriented towards a first position of the driver seat of the motor vehicle is provided and/or to process the signals from the second and third microphones in the first operating mode in such a manner that a (first) passenger seat directivity oriented towards a first position of a passenger seat of the motor vehicle is provided.

In some embodiments, in the first operating mode, the signal processing device is configured to provide a driver interfering noise directivity, which is different from the driver directivity by processing the signals of at least two microphones together, for example, by forming a differential signal, and to process, in particular to filter a driver useful signal associated with the driver directivity, i. e., a signal which comes at least predominantly from the direction corresponding to the driver directivity, in dependence on a driver interfering signal associated with the driver interfering noise directivity, i. e., a signal from the direction corresponding to the driver interfering noise directivity.

In some embodiments, by way of non-limiting example, the signal processing device is configured to provide in the first operating mode a passenger interfering noise directivity, which is different from the passenger directivity by processing the signals of at least two microphones together, and to process, in particular to filter a passenger useful signal associated with the passenger directivity, i.e., a signal from the direction corresponding to the passenger directivity, in dependence on a passenger interfering signal associated with the passenger interfering noise directivity, i.e., a signal from the direction corresponding to the passenger interfering noise directivity. The "or" of the characterising part of the main claim can therefore be considered as an "and/or."

In some embodiments, the further processing of the respective useful signals preferably comprises an improvement of the signal or the signal quality by an interfering noise or noise reduction by the deliberate formation of a directivity; the respective interfering noise directivity, which is oriented towards a direction which is different from the direction of the useful signal, is determined by the corresponding driver or passenger directivity, in order to use the interfering signal obtained from the signals of the two microphones for filtering the useful signal. This is possible because the useful signal includes parts of the interfering signal, despite the directivity associated with it or on which it is based. These parts can therefore be identified and efficiently suppressed. Thereby, the interfering noise directivity, i.e., the driver and/or passenger interfering noise directivity, is different from the driver or passenger directivity. Accordingly, the interfering directivities are different from all directivities of the microphone system that can be or are associated with a useful signal.

In some embodiments, background noise, which is represented by the interfering signal or interfering noise and which originates from a different position than the positions corresponding to the selected provided directivity, is suppressed. Especially if the corresponding interfering noise directivity does not coincide or overlap with the directivity that can be associated with a further useful signal, it is possible to suppress the interfering noise very effectively. This improves the quality of the corresponding useful signal by reducing signal noise (which may correspond to the interfering signal or interfering noise). The flexibility of the microphone system is also improved, since a suitable interfering noise directivity can be selected in different situations, so that the useful signal can be picked up, stored and/or forwarded by the microphone system in the best possible quality.

In some embodiments, an improved microphone system can be implemented at a particularly low cost since neither alteration in the microphone housing and in the microphones themselves nor additional microphone is needed. For the selection of the corresponding directivity, no external signal from a control member or a further system of the motor vehicle is required either, so that for the extended functionality of the interfering noise reduction in the useful signal, for example, no additional linking of the microphone system with further systems of the motor vehicle is necessary. By way of non-limiting example, the interfering noise directivity can be selected automatically with a main extension direction oriented opposite to a main extension direction of the driver or passenger directivity starting from the microphone system.

In some embodiments, the interfering noise reduction described above also applies with only two microphones, although here only one directivity and one interfering noise directivity can be generated at a time.

In some embodiments, it is provided that the three microphones are pressure microphones. The pressure microphones are low priced and simple. Each of the three pressure microphones is having an omnidirectivity. Moreover, it is particularly due to the omnidirectivity of the different microphones in the different operating modes that a very good directivity can be achieved in each case by combining the different microphones and the respective omnidirectivity. This would be different, for example, if one or a plurality of the microphones already had a specific directivity, which would, for example, be optimized for the first position of the driver seat.

In some embodiments, it is provided that the three microphones are disposed at respective corners of an isosceles triangle, with the second microphone in particular being located at the apex of the triangle. Accordingly, the driver and passenger directivities are symmetrical, so that the microphone housing can easily be positioned in the vehicle in such a manner that noise from different positions in the driver seat and from different positions in the passenger seat can be equally well captured. In this case, the microphones are particularly well suited for creating the respective noise directivity and therefore for the effective reduction of the interfering noise, i.e., the interfering signal components or interfering signal parts in the respective useful signal.

In some embodiments, it is provided that the triangle is an obtuse triangle, in particular with an angle of at least 100 degrees at the apex of the triangle. Accordingly, a suitable directivity can be provided for the different positions of driver and passenger seats and the different positions of potential sources of interfering noise, and at the same time a distance between the microphone housing and the driver or passenger seat can be minimized, especially between the microphone housing and the first position of the driver and passenger seats. This makes it possible to detect noises in different positions of the driver or passenger seat particularly well and at the same time suppress the corresponding interfering noise particularly well.

In some embodiments, the signal processing device is configured to process the signals of the second and first microphone for providing the driver interfering noise directivity in such a manner that the driver interfering noise directivity, starting from the microphone system, has a main extension direction oriented opposite to a main extension direction of the driver directivity. The signal processing device is configured to process the signals of the third and second microphones for providing the passenger interfering noise directivity in such a manner that the passenger interfering noise directivity, starting from the microphone system, has a main extension direction oriented opposite to a main extension direction of the passenger directivity. The orientation of the respective directions starting from the microphone system is thereby specified in each case starting from the microphone system along the main extension direction of the driver or passenger directivity.

In some embodiments, it may also be provided that the signal processing device is configured for providing the driver interfering noise directivity and/or passenger interfering noise directivity to process the signals of the two microphones together (or the respective microphones may be selected) in such a manner that the driver interfering noise directivity and/or the passenger interfering noise directivity, starting from the microphone system, has a main extension direction oriented opposite to the main extension direction of the driver or passenger directivity. The opposite orientation or alignment of the interfering noise directivity and the driver/passenger directivity can thus also be specified for microphones other than the second and first or third and second microphones.

Accordingly, effective interfering noise reduction is possible, since a signal or noise coming from the opposite direction of the driver or passenger directivity oriented towards the driver or passenger seat is almost certainly an interfering noise and must therefore be suppressed in the detected useful signal. In addition, an interfering noise directivity oriented towards the windscreen can be achieved if the arrangement is as intended to cause numerous reflections that generate interfering noise signals on the windscreen.

In some embodiments, it is provided that the signal processing device is configured, in a further second operating mode, to process the signals of the first and third microphone in such a manner that an alternative driver directivity is provided which is oriented towards a second position of the driver seat, and/or in the further second operating mode to process the signals of the second and third microphone in such a manner that an alternative passenger directivity is provided which is oriented towards a second position of the passenger seat. The signal processing device is thereby configured to provide in each case a corresponding alternative driver interfering noise directivity and/or alternative passenger interfering noise directivity by processing the signals from the respective corresponding microphones together, in particular the signals of the third and first microphone for the alternative driver interfering noise directivity and the signals of the third and second microphone for the alternative passenger interfering noise directivity.

Accordingly, in the first operating mode, an acoustic signal of the first position of the driver seat with a corresponding first driver directivity that is optimized for the first position can be detected particularly effectively and, at the same time, in a changed position of the driver seat, for example, if a driver moves the seat so as to fit his height, in order to better reach the relevant pedals, an alternative driver directivity can be provided, which optimally detects an acoustic signal of the new position of the driver seat. Accordingly, this increased flexibility naturally also applies to the respective alternative interfering noise directivity, so that the interfering noise or the signal noise can be detected particularly well here and therefore suppressed in the useful signal. The same applies mutatis mutandis for the seat passenger directivity.

In some embodiments, it is provided that the signal processing device is configured to process the signal of one of the three or four microphones together with a mixed signal of at least two or three other microphones in order to provide the respective interfering noise directivity, i.e., the driver interfering noise directivity and/or the passenger interfering noise directivity, also of a plurality of driver or passenger interfering noise directivities.

Accordingly, the alignment of the respective interfering noise directivity can be specified or predefined with particular accuracy, so that the interfering noise in the respective useful signal, i.e., in the driver and/or passenger useful signal, can be suppressed particularly effectively.

In some embodiments, the signal processing device is configured to process the signal of the first microphone or a mixed signal of the second and third microphones in such a manner that a driver directivity is provided which is oriented towards a position of the driver seat between the first and the second position of the driver seat. By way of non-limiting example, the signal processing device can be configured to process the signal from the third microphone and a mixed signal from the first and second microphones in such a manner that a passenger directivity is provided which is oriented towards a position of the passenger seat between the first and second position of the passenger seat. A virtual signal of a further microphone, which is respectively located between the second and the third or the first and the second microphones, is therefore generated by means of the mixed signal of the second and the third or of the first and the second microphones. In doing so, the position of the further microphone between the two respective other microphones, i.e., between the second and the third or the first and the second microphone, can be adjusted via an appropriate weighting of the second and the third or the first and the second signal of the respective microphone in the respective mixed signal. This can, for example, be achieved by adding the respective signal of the second and the third or respectively of the first and the second microphones, constituting the individual signals of the respective mixed signal, to produce a respective weighted mixed signal. The further alternative directivity can thus be made available from the mixed signal and the respective other signal by means of an appropriate addition or subtraction. The alignment of the directivity for the passenger and/or driver seat can be adjusted by varying the weighting of the individual signals from the two microphones in the mixed signal. The same applies to the mixed signal and the signal from one of the three microphones and the mixed signal from at least two other microphones when providing the respective interfering noise directivity.

In some embodiments, the passenger and driver directivity and, the respective interfering noise directivity can be optimized not only for a first and second position, but for any intermediate position. Here as well the respective weighting for the individual signals of the mixed signals can be determined automatically, for example, by the signal processing device detecting from which direction or respectively by means of which of the different directivities the best acoustic signal or the worst acoustic signal is detected. This can be done without additional microphones, in particular without a hardware-side adjustment of the microphone system, for example, by accordingly processing the digitized signals from the microphone in the signal processing device.

In some embodiments, it is provided that a fourth microphone is disposed in the microphone housing, and the signal processing device is configured to process the signals of the first and fourth microphone in another third operating mode in such a manner that another alternative driver directivity is provided, which is oriented towards a third position of the driver seat and/or in the other third operating mode, or to process the signals from the fourth and third microphones in such a manner that another alternative passenger directivity is provided which is oriented towards a third position of the passenger seat, wherein the second position of the driver seat is located between the first and third position of the driver seat and the second position of the passenger seat is located between the first and third position of the passenger seat. By way of non-limiting example, in the third operating mode, the signals from the first and fourth microphone may also be processed in such a manner that a first back seat directivity is provided which is oriented towards a first position on a back seat of the motor vehicle, and/or the signals from the third and fourth microphone may be processed in such a manner that a second back seat directivity, different from the first, is provided which is oriented towards a second position on the back seat of the motor vehicle different from the first, and/or the signals from the second and fourth microphone may be processed in such a manner that a third back seat directivity different from that of the first and second microphone is provided which is oriented towards a third position on the back seat of the motor vehicle different from the first and second. In particular, the third position on the back seat may be located between the first and the second position.

In some embodiments, the signal processing device is further configured to provide in each case a corresponding another alternative driver interfering noise directivity and/or another alternative passenger interfering noise directivity by processing the signals from the corresponding microphones together, in particular the signals of the fourth and first microphone for the other alternative driver interfering noise directivity and the signals of the third and fourth microphone for the other alternative passenger interfering noise directivity. This also applies mutatis mutandis to the back seat directivity.

Accordingly, the flexibility of the microphone system is further increased and with a slight modification, namely the one additional microphone in the microphone housing, a plurality of further positions for the driver and passenger or one or a plurality of passengers on the back seat as well as for the respective noise or interfering source of the interfering noise can be considered or compensated for.

In some embodiments, provisions are made for the first, third and fourth microphones to be disposed in the form of another isosceles triangle at respective corners of the additional triangle, with the fourth microphone located at the apex of the triangle. Due to its symmetry, the geometry mentioned above can detect the useful acoustic signal from the driver and/or passenger seat as well as for the corresponding detection of the interfering noise.

In some embodiments, provisions can be made for the distance of the fourth microphone from the first and the third microphone to be less than the distance of the second microphone from the first and the third microphone. As a result, by processing the signals of the third and fourth microphone with the signal processing device, an additional driver directivity, which, like the first driver directivity, is oriented towards the first position of the driver seat, can be provided in the first operating mode in addition to the first driver directivity, which is oriented towards the first position. Accordingly, a wide range of interfering noise directivities can be provided. The same applies mutatis mutandis to the passenger directivity, which is oriented towards the first position of the passenger's seat, and the processing of the two signals from the first and the fourth microphones. This results in a particularly strong directional effect of the microphone system, so that an acoustic signal can be detected particularly well from the respective position of the driver or passenger seat and the interfering noise can also be detected particularly well and calculated or filtered out of the useful signal accordingly. The resulting increased dynamics in the directionally dependent sensitivity of the microphone system can also be used to minimize fluctuations in signal quality.

The present disclosure also describes a motor vehicle with a microphone system according to one of the embodiments described herein.

The present disclosure also describes a method for operating a microphone system of a motor vehicle, wherein the microphone system has a microphone housing in which a first microphone, a second microphone and a third microphone are disposed, and a signal processing device which is configured to process respective signals provided by the microphones and, in a first operating mode, to process the signals of the first and second microphones in such a manner that a driver directivity oriented towards a first position of the driver seat of the motor vehicle is provided, and/or to process the signals of the second and third microphones in such a manner that a passenger directivity oriented towards a first position of a passenger seat of the motor vehicle is provided.

In some embodiments, a method step is thereby to provide a driver interfering noise directivity and/or a passenger interfering noise directivity by processing the signals of the two microphones together, for example, subtracting them from each other. Another method step is a further processing of a driver useful signal associated with the driver directivity in dependence on a driver interfering signal associated with the driver directivity and/or a passenger useful signal associated with the passenger directivity in dependence on a passenger interfering signal associated with the passenger directivity. This means that the signals from the two microphones can be processed together in order to obtain either a driver useful signal or a driver interfering signal in accordance with the driver directivity or the driver interfering noise directivity resulting from the combined processing, and the driver useful signal can then be further processed using the driver interfering signal, e.g., filtered, in order to obtain a driver useful signal with improved quality. This applies mutatis mutandis to the passenger directivity, passenger interfering noise directivity, passenger useful signal and passenger interfering signal.

The features and feature combinations mentioned above in the description, as well as the features and feature combinations mentioned below in the description of the figures and/or shown only in the figures, can be used not only in the respectively specified combination but also in other combinations without getting out of the scope of the present disclosure. Embodiments of the present disclosure, which are however not explicitly shown and explained in the figures, derive from and can be produced by separated combinations of features from the embodiments explained, are thus to be regarded as included and disclosed. Embodiments and combinations of features, which thus do not have all the features of an originally formulated independent claim, are also to be regarded as disclosed. Furthermore, embodiments and combinations of features, in particular through the embodiments set out above, which go beyond or deviate from the combinations of features set out in the back references of the claims, are to be regarded as disclosed.

Embodiments of the present disclosure are explained in greater detail below with reference to schematic drawings.

Identical or functionally identical elements are provided with the same reference numbers in the figures.

FIG. 1 shows an exemplary embodiment of a microphone system 2 in a motor vehicle 1. The motor vehicle 1 is shown from an inside perspective. In the example shown, the microphone system 2 comprises a microphone housing 3 with a first microphone 11, a second microphone 12 and a third microphone 13. These microphones 11 to 13 are presently disposed in the form of an isosceles triangle at the respective corners of the triangle. The second microphone 12 is here disposed at the apex of the triangle. The microphones 11 to 13 are coupled to a signal processing device 4. In the example shown here the microphone housing 3 with the microphones 11 to 13 is disposed in a roof liner 5 of the motor vehicle 1, in this case in a roof module 6, which may, for example, be configured as an interior lighting device.

In accordance with some embodiments, the signal processing device 4 is now configured to process the signals of the first and second microphones 11, 12 in such a manner that a first driver directivity A1 oriented towards a first position of a driver seat 7 of the motor vehicle 1 is provided, as well as to process the signals of the second and third microphones 12, 13 so that a first passenger directivity B1 oriented towards a first position of a passenger's seat 8 of the motor vehicle 1 is provided. The signal processing device 4 is therefore configured to detect a driver or passenger useful signal from the respective position of the driver's or passenger's seat 7, 8.

The signal processing device 4 in this case is also configured to provide a driver interfering noise directivity AS1 by processing the signals of two microphones, in this case the second and first microphone 12, 11, together and to provide a passenger interfering noise directivity BS1 by processing the signals of two microphones, in this case the third and second microphone 13, 12, together. In the example shown, the driver directivity A1 and the driver interfering noise directivity AS1 extend from the microphone housing 3 in opposite directions, i.e. the driver directivity A1 diagonally into the interior towards the driver seat 7 and the driver interfering noise directivity AS1 diagonally towards a passenger-side area of the windscreen.

The signal processing device 4 is thereby also configured to further process a correspondingly detected useful driver signal associated with the driver directivity A1, i.e. originating from the direction of the driver directivity A1, in dependence on a driver interfering signal associated with the driver interfering noise directivity AS1 and, if present, to further process a useful passenger signal associated with the passenger directivity B1 in dependence on a passenger interfering signal associated with the passenger interfering noise directivity BS1. In this case, in addition to the driver interfering signal, the passenger interfering signal can also be used to further process the driver useful signal, i.e., to filter or improve it, i.e., the driver useful signal can also be further processed in dependence on the passenger interfering signal assigned to the passenger interfering noise directivity BS1 and/or the passenger useful signal can also be further processed in dependence on the driver interfering signal.

Figure 2:
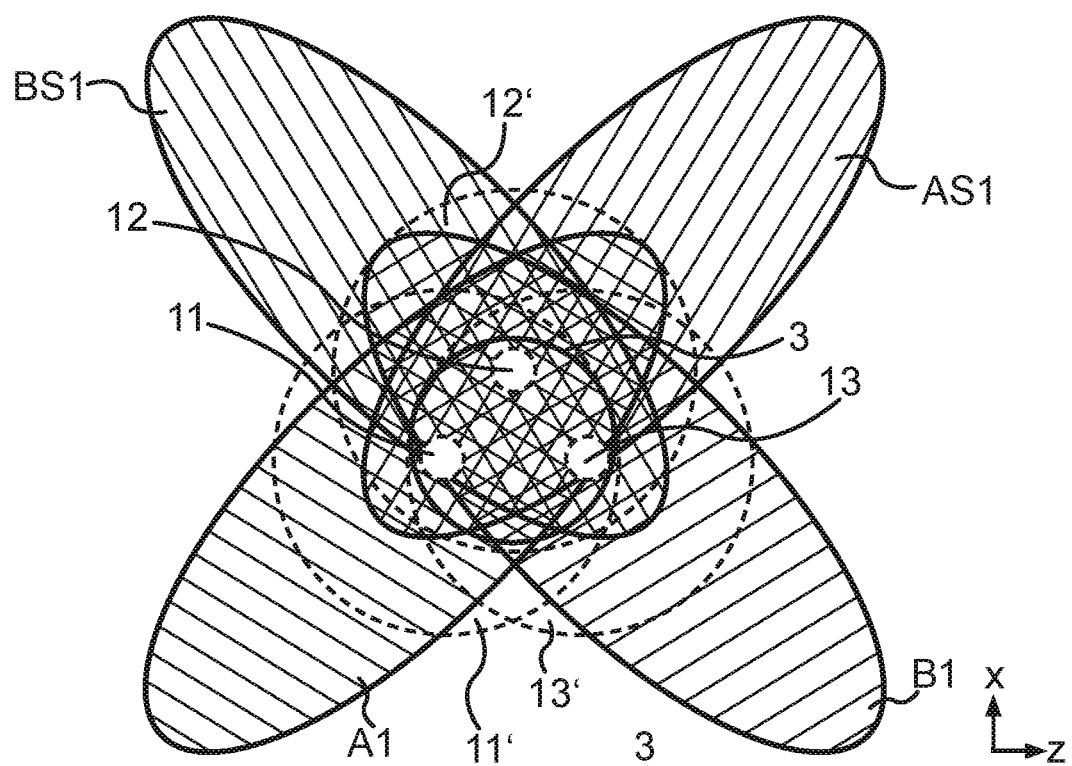
FIG. 2 shows a schematic representation of directivities of a microphone system, in accordance with some embodiments.

FIG. 2 shows exemplary directivities of a first exemplary embodiment of the microphone system. These microphones 11 to 13 each have an omnidirectional directivity 11', 12', 13'. Additionally to the first driver and passenger directivities A1, A2, which can be provided or generated for the microphone system 2 by appropriate processing, e.g. adding or subtracting the signals of the first and second microphones 11, 12 or the third and second microphones 13, 12, respectively, the two second interfering noise directivities, namely the first driver interfering noise directivity AS1 and the first passenger interfering noise directivity BS2, are shown here. These have a lenticular extent in the example shown. The main axes and therefore the main extension directions of the respective directivities A1, B1, AS1, BS1 run through the respective microphones, i.e. for the first driver directivity A1 through the first and second microphones 11, 12 and for the first passenger directivity B1 through the second and third microphones 12, 13 and for the interfering noise directivities AS1, BS1 through the first and second microphones 11, 12 and second and third microphones 12, 13 respectively.

The main axes of the driver directivity A1, AS1 are tilted relative to the main axes of the passenger directivity B1, BS1 in the xy-plane in such a manner that different positions of the driver's and passenger's seats can be covered by the directivity, as well as different positions for an interfering noise source, such as the windscreen in FIG. 1.

In this case, the interfering noise directivities are oriented in the exact opposite direction towards the driver and passenger directivities.

Figure 3:
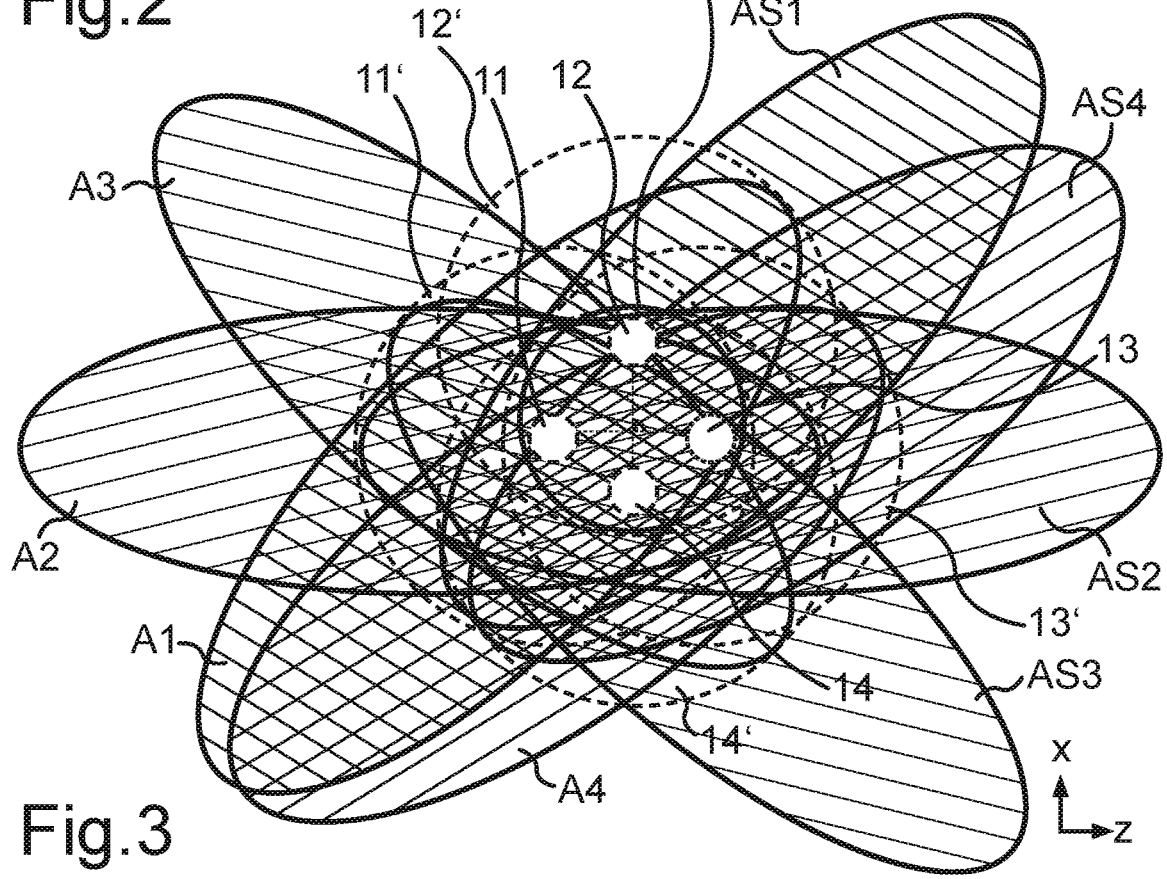
FIG. 3 shows a schematic representation directivities of a microphone system, in accordance with some embodiments.

FIG. 3 shows a further schematic representation of further exemplary directivities of a further exemplary embodiment of the microphone system 2. For reasons of clarity, the illustrated directivities A1 to A4 are exclusively driver directivities. However, because of the structural and functional geometry, whatever is described below concerning the driver directivities A1 to A4 also applies mutatis mutandis to the corresponding passenger directivities, in which case the first microphone 11 is to be replaced with the third microphone 13.

In the example shown, a fourth microphone 14 is now disposed in the housing 3. In this case, a line passing through the second microphone 12 and fourth microphone 14 intersects a line passing through the first microphone 11 and the third microphone 13 at a right angle. These microphones 11 to 14 can therefore be disposed correspondingly on a diamond or a rhombus. Not only are the three first microphones 11 to 13 disposed at respective corners of a triangle in the shape of an isosceles triangle, but also the first, third and fourth microphones 11 to 14 in the form of another isosceles triangle with said microphones 11, 13, 14 at the respective corners.

As shown in FIG. 2, the microphones 11 to 14 have omnidirectional directivities 11' to 14'. By adding and subtracting the respective signals from the microphones 11 to 14 accordingly, as described in FIG. 2, a first driver directivity A1 and an alternative second driver directivity A2 can be provided by the first and third microphone 11, 13. A third alternative driver directivity A3 can now be provided by means of the fourth microphone 14, by processing the signals of the first and the fourth microphone 11, 14. This third directivity is configured so that a corresponding third position of the driver seat 7, towards which the third alternative driver directivity A3 is oriented, is disposed in the travel direction, that is to say in the positive x direction, in front of the second driver directivity A2. The second driver directivity A2 is oriented towards the second position of the driver seat 7 between the first and the third position of the driver seat 7.

The signal processing device 4 (FIG. 1) in the proposed embodiment may additionally be configured to process the signals of the third microphone 13 and of the fourth microphone 14 in such a manner that a fourth driver directivity A4, which is also oriented towards the first position of the driver seat 7, is provided as an alternative or in addition to the first driver directivity A1. The fourth driver directivity A4 can be provided at the same time as the first driver directivity A1 in such a manner that for the first position of the driver seat 7 a double coverage is achieved by the two driver directivities A1, A4.

Corresponding to the driver directivities A1 to A4, the joint processing of the respective microphones 11 to 14 also provides driver interfering noise directivities AS1 to AS4, which each have a main extension direction starting from the microphone housing 3, which runs in the opposite direction to the respective associated driver directivity A1 to A4. For particularly good interfering noise reduction, a plurality or all of the driver interfering noise directivities AS1 to AS4 can be provided simultaneously for one driver directivity. For example, the second driver directivity A2 may be selected to detect a driver useful signal from the second position of the driver seat 7 and, at the same time, the driver interfering noise directivities AS1 to AS4 may be provided together to detect respective driver interfering signals originating from a plurality of corresponding positions and to suppress or filter out corresponding parts in the driver useful signal originating from the second position of the driver seat 7. In addition, one or a plurality of passenger interfering noise directivities BS1 (FIG. 2) can be provided in order to suppress a component of the passenger interfering signal in the driver useful signal.

The invention claimed is:

1. A microphone system for a motor vehicle, the microphone system comprising:
   a first microphone;
   a second microphone;
   a third microphone;
   a microphone housing adapted to dispose the first microphone, the second microphone, and the third microphone within the microphone housing, wherein the first microphone, the second microphone, and the third microphone are arranged to receive respective acoustic signals, the respective acoustic signals including interfering acoustic noise signals from reflections of acoustic signals by a windscreen of the motor vehicle; and
   a signal processing device configured to:
      receive respective electrical signals from the first microphone, the second microphone, and the third microphone based on the received respective acoustic signals;
      provide a driver directivity oriented towards a first position of a driver of the motor vehicle based on processing of the respective electrical signals of the first and second microphones;
      provide a driver interfering noise directivity based on processing of the respective electrical signals of a first set of two microphones together, wherein the driver interfering noise directivity corresponds to a main extension direction oriented opposite a main extension direction of the driver directivity;
      process a driver signal associated with the driver directivity in dependence on a driver interfering signal associated with the driver interfering noise directivity;
      provide a passenger directivity oriented towards a first position of a passenger seat based on processing of the respective electrical signals of the second and third microphones;
      provide a passenger interfering noise directivity based on processing of the respective electrical signals of a second set of two microphones together, wherein the passenger interfering noise directivity corresponds to a main extension direction oriented opposite a main extension direction of the passenger directivity; and process a passenger signal associated with the passenger directivity in dependence on a passenger interfering signal associated with the passenger interfering noise directivity.

2. The microphone system of claim 1, wherein the first microphone, the second microphone, and the third microphone are configured as pressure microphones having an omnidirectivity.

3. The microphone system of claim 1, wherein the first microphone, the second microphone, and the third microphone are disposed at respective corners of a triangle in the shape of an isosceles triangle.

4. The microphone system of claim 3, wherein the triangle is an obtuse-angled triangle with an angle of at least 100 degrees.

5. The microphone system of claim 1, wherein the signal processing device is further configured to:

provide an alternative driver directivity based on processing of the respective electrical signals of the first and third microphones, wherein the alternative driver directivity is oriented towards a second position of a driver seat; and provide an alternative driver interfering noise directivity corresponding to the alternative driver directivity based on processing of the respective electrical signals from the third microphone and the first microphone together for the alternative driver interfering noise directivity.

6. The microphone system of claim 1, wherein the signal processing device is further configured to:

provide an alternative passenger directivity based on processing of the respective electrical signals of the second and third microphones, wherein the alternative passenger directivity is oriented towards a second position of the passenger seat; and provide an alternative passenger interfering noise directivity corresponding to the alternative passenger directivity based on processing of the respective electrical signals from the third and second microphones for the alternative passenger interfering noise directivity.

7. The microphone system of claim 1, wherein the signal processing device is further configured to:

provide the driver interfering noise directivity, the passenger interfering noise directivity, an alternative driver interfering noise directivity, an alternative passenger interfering noise directivity based on processing the respective electrical signal of one of the first, second, and third microphones together with a further electrical signal generated based on mixing of respective electrical signals of at least two other microphones.

8. The microphone system of claim 1, further comprising:

a fourth microphone disposed in the microphone housing, and wherein the signal processing device is further configured to:

provide another alternative driver directivity based on processing of the respective electrical signal of the first microphone and a respective electrical signal from the fourth microphone, wherein the other alternative driver directivity is oriented towards a third position of a driver seat, wherein a second position of the driver seat is disposed between a first position of the driver seat and the third position of the driver seat, provide another alternative driver interfering noise directivity corresponding to the other alternative driver directivity based on processing of the respective electrical signals from the fourth and first microphones for the other alternative driver interfering noise directivity, provide another alternative passenger directivity based on processing of the respective electrical signals from the fourth and third microphones, wherein the other alternative passenger directivity is oriented towards a third position of the passenger seat, wherein a second position of the passenger seat is located between the first position of the passenger seat and the third position of the passenger seat, and provide another alternative passenger interfering noise directivity corresponding to the other alternative passenger directivity based on processing of the respective electrical signals from the third and fourth microphones for the other alternative passenger interfering noise directivity.

9. The microphone system of claim 8, wherein the first microphone, the third microphone, and the fourth microphone are disposed at respective corners of a triangle, wherein the triangle is in a shape of an isosceles triangle, and wherein the fourth microphone is located at an apex of the triangle.

10. A motor vehicle, comprising:

a passenger seat;

a microphone system that comprises:

a first microphone;

a second microphone;

a third microphone;

a microphone housing adapted to dispose the first microphone, the second microphone, and the third microphone within the microphone housing, wherein the first microphone, the second microphone, and the third microphone are arranged to receive respective acoustic signals, the respective acoustic signals including interfering acoustic noise signals from reflections of acoustic signals by a windscreen of the motor vehicle; and a signal processing device configured to:

receive respective electrical signals from the first microphone, the second microphone, and the third microphone based on the received acoustic signals;

provide a driver directivity oriented towards a position of a driver of the motor vehicle based on processing of the respective electrical signals of the first and second microphones;

provide a driver interfering noise directivity based on processing of the respective electrical signals of a first set of two microphones together, wherein the driver interfering noise directivity corresponds to a main extension direction oriented opposite a main extension direction of the driver directivity;

process a driver signal associated with the driver directivity in dependence on a driver interfering signal associated with the driver interfering noise directivity;

provide a passenger directivity oriented towards a position of the passenger seat based on processing of the respective electrical signals of the second and third microphones;

provide a passenger interfering noise directivity based on processing of the respective electrical signals of a second set of two microphones together, wherein the passenger interfering noise directivity corresponds to a main extension direction oriented opposite a main extension direction of the passenger directivity; and process a passenger signal associated with the passenger directivity in dependence on a passenger interfering signal associated with the passenger interfering noise directivity.

11. A method for operating a microphone system of a motor vehicle, the method comprising:

receiving, at a signal processing device of the microphone system, respective electrical signals from a first microphone, a second microphone, and a third microphone disposed in a microphone housing, wherein the first microphone, the second microphone, and the third microphone are arranged to receive respective acoustic signals, the respective acoustic signals including interfering acoustic noise signals from reflections of acoustic signals by a windscreen of the motor vehicle;

providing, by the signal processing device, a driver directivity oriented towards a position of a driver of the motor vehicle based on processing of the respective electrical signals of the first and second microphones;

providing, by the signal processing device, a driver interfering noise directivity based on processing of the respective electrical signals of a first set of two microphones together, wherein the driver interfering noise directivity corresponds to a main extension direction oriented opposite a main extension direction of the driver directivity;

processing, by the signal processing device, a driver signal associated with the driver directivity in dependence on a driver interfering signal associated with the driver interfering noise directivity;

providing, by the signal processing device, a passenger directivity oriented towards a position of a passenger seat based on processing of the respective electrical signals of the second and third microphones;

providing, by the signal processing device, a passenger interfering noise directivity based on processing of the respective electrical signals of a second set of two microphones together, wherein the passenger interfering noise directivity corresponds to a main extension direction oriented towards a main extension direction of the passenger directivity; and processing, by the signal processing device, a passenger signal associated with the passenger directivity in dependence on a passenger interfering signal associated with the passenger interfering noise directivity.

* * * * *